US011984017B2

(12) United States Patent
Petrucci

(10) Patent No.: US 11,984,017 B2
(45) Date of Patent: May 14, 2024

(54) IN-FIELD SENSOR PROGRAMMING

(71) Applicant: ECOLINK INTELLIGENT TECHNOLOGY, INC., Carlsbad, CA (US)

(72) Inventor: Carlo Q. Petrucci, Carlsbad, CA (US)

(73) Assignee: ECOLINK INTELLIGENT TECHNOLOGY, INC., Carlsbad, CA (US)

( * ) Notice: Subject to any disclaimer, the term of this patent is extended or adjusted under 35 U.S.C. 154(b) by 267 days.

(21) Appl. No.: 17/096,241

(22) Filed: Nov. 12, 2020

(65) Prior Publication Data

US 2021/0065534 A1 Mar. 4, 2021

Related U.S. Application Data

(62) Division of application No. 16/507,128, filed on Jul. 10, 2019, now Pat. No. 10,839,677, which is a division of application No. 16/138,477, filed on Sep. 21, 2018, now Pat. No. 10,366,601, which is a division of application No. 15/864,801, filed on Jan. 8, 2018, now Pat. No. 10,115,296, which is a division of application No. 15/252,680, filed on Aug. 31, 2016, now Pat. No. 9,898,923.

(51) Int. Cl.

*G08B 29/14* (2006.01)
*G08B 13/08* (2006.01)
*G08B 29/18* (2006.01)

(52) U.S. Cl.

CPC ............ *G08B 29/14* (2013.01); *G08B 29/18* (2013.01); *G08B 13/08* (2013.01)

(58) Field of Classification Search

CPC ........ G08B 29/14; G08B 29/18; G08B 13/08; G08B 25/003

See application file for complete search history.

(56) References Cited

U.S. PATENT DOCUMENTS

| | | | | |
|---|---|---|---|---|
| 4,737,770 | A | 4/1988 | Brunius et al. | |
| 4,811,377 | A * | 3/1989 | Krolopp | H04W 88/02 455/410 |
| 5,077,547 | A * | 12/1991 | Burgmann | G08B 25/10 340/539.22 |
| 5,959,529 | A | 9/1999 | Kail, IV | |
| 6,032,109 | A | 2/2000 | Ritmiller, III | |
| 9,110,747 | B2 * | 8/2015 | Karayi | G06F 8/60 |
| 9,898,923 | B1 | 2/2018 | Petrucci | |

(Continued)

OTHER PUBLICATIONS

European Patent Office, Supplementary Search Report issued on European patent application No. 17847281.7, dated Apr. 6, 2020, 9 pgs.

(Continued)

*Primary Examiner* — Daryl C Pope

(74) *Attorney, Agent, or Firm* — Greenberg Traurig, LLP

(57) ABSTRACT

A method, system, and apparatus for programming a sensor at a customer location is disclosed. A defective sensor at a customer location is replaced by a new sensor that is programmed at the customer location using a programming device or a transducer coupled to a computing device. The new sensor is programming using the sensor's detector normally used to sense a change in a magnetic field, an RF signal, infra-red light, or some other emission or property.

10 Claims, 9 Drawing Sheets

(56) References Cited

U.S. PATENT DOCUMENTS

| | | | | |
|---|---|---|---|---|
| 10,115,296 | B2 | 10/2018 | Petrucci | |
| 2004/0249485 | A1 * | 12/2004 | Bondarev | G08C 17/02 73/1.01 |
| 2006/0238337 | A1 | 10/2006 | Minassian et al. | |
| 2007/0063836 | A1 | 3/2007 | Hayden et al. | |
| 2007/0093991 | A1 | 4/2007 | Hoogenboom | |
| 2016/0148498 | A1 * | 5/2016 | Ruszala | G08B 25/003 340/506 |

OTHER PUBLICATIONS

ISA/US, International Search Report and Written Opinion issued on PCT application No. US17/48804, dated Sep. 12, 2017, 7 pgs.

EPO, Examination report issued on European patent application No. 17847281.7, dated Aug. 20, 2021, 7 pages.

* cited by examiner

IN-FIELD SENSOR PROGRAMMING

CROSS-REFERENCE TO RELATED APPLICATIONS

This application is a divisional of U.S. patent application Ser. No. 16/507,128, filed on Jul. 10, 2019, soon to be U.S. Pat. No. 10,839,677, which is a divisional of U.S. patent application Ser. No. 16/138,477, filed on Sep. 21, 2018, now U.S. Pat. No. 10,366,601, which is a divisional of U.S. patent application Ser. No. 15/864,801, filed on Jan. 8, 2018, now U.S. Pat. No. 10,115,296, which is a divisional of U.S. patent application Ser. No. 15/252,680, filed on Aug. 31, 2016, now U.S. Pat. No. 9,898,923.

BACKGROUND

Field of Use

The present application relates to the field of electronic sensors. More specifically, the present application relates to replacement of such sensors after they have been deployed to customer locations.

Description of the Related Art

Security systems for homes and businesses have become quite popular. Often, these systems make use of sensors, such as door and window sensors installed onto doors and windows, motion detectors, sound detectors, etc. Door and window sensors typically comprise two distinct parts: a magnet and a reed switch assembly. The reed switch assembly is typically installed onto a movable part of a window or onto a door edge, while the magnet is mounted to a stationary surface, such as a door or window frame. When the door or window is closed, the magnet and reed switch are in close proximity to one another, maintaining the reed switch in a first state indicative of a "no alarm" condition. If the door or window is opened, proximity is lost between the magnet and the reed switch, resulting in the reed switch changing state, e.g., from closed to open or from open to closed. The change of state is indicative of a local alarm condition, and a signal may be generated by circuitry located within the reed switch assembly and sent, via wires or over-the-air, to a local security panel. Alternatively, or in addition, a loud audible alert is generated, either at the security panel in the home or directly by the circuitry within the reed switch assembly, indicating that a door or window has been opened without authorization.

Often times, security systems are installed and maintained by professional security service providers, such as ADT, Vivint, ProtectionOne, etc., or by smaller, third-party security service providers. When a sensor fails, a security service provider may be dispatched to determine the nature of the failure. The security service provider may determine that a sensor is no longer operating as it should and, therefore, must be replaced with the same make and model number, or a similar sensor.

Replacing such a sensor requires that the new sensor be "learned" into the security system in order to be recognized as a valid sensor by the security system. In order to learn a sensor into the security system, a security panel located typically needs to be accessed by the security provider while the security provider is on-site at the customer location. However, security panels generally require a passcode to access the learn feature, and oftentimes the security service provider does not have the code, for a variety of reasons. Thus, it is impossible to learn in a new sensor.

It would be desirable to replace defective sensors without having to access as associated security panel.

SUMMARY

The embodiments described herein relate to methods, systems, and apparatus for programming a replacement sensor after a defective sensor has failed at a customer location.

In one embodiment, a stand-alone programming device is described, comprising a data interface, a memory for storing processor-executable instructions, a transducer for modulating a magnetic field, an RF signal or infra-red light, a transducer driver coupled to the transducer, and a processor coupled to the data interface, the memory and the transducer driver, for executing the processor-executable instructions that causes the apparatus to receive, by the processor, sensor data from the data interface, the sensor data comprising sensor identification information, provide, by the processor, the sensor data to the transducer driver, generate, by the transducer driver, an electronic driver signal matching the sensor data capable of electronically driving the transducer, and modulate, by the transducer, the magnetic field, the RF signal or the infra-red light in accordance with the electronic driver signal.

In another embodiment, a method performed by a stand-alone programming device is described, comprising receiving, by a processor, sensor data from a data interface, the sensor data comprising sensor identification information, providing, by the processor, the sensor data to a transducer driver, generating, by the transducer driver, an electronic driver signal matching the sensor data and capable of electronically driving the transducer, and modulating, by the transducer, a magnetic field, an RF signal or infra-red light in accordance with the electronic driver signal.

In yet another embodiment, an transducer module coupled to a computing device for programming a sensor at a customer location is described, comprising a data interface for receiving sensor data relating to the sensor, a transducer driver coupled to the data interface for receiving the sensor data and for generating an electronic driver signal matching the sensor data and capable of electronically driving a transducer, and the transducer for receiving the electronic driver signal and for modulating a magnetic field, an RF signal, or infra-red light based on the electronic driver signal, wherein the sensor is programmed with the sensor data as a result of detecting the modulated magnetic field, the modulated RF signal, or the modulated infra-red light.

In yet still another embodiment, a method performed by a transducer module coupled to a computing device for programming a sensor in the field is described, comprising receiving, by a data interface, sensor data from the computing device relating to the sensor, receiving, by a transducer driver coupled to the data interface, the sensor data and generating an electronic driver signal based on the sensor data and capable of electronically driving a transducer, and receiving, by the transducer, the electronic driver signal and for modulating a magnetic field, an RF signal, or infra-red light based on the electronic driver signal, wherein the sensor is programmed with the sensor data as a result of detecting the modulated magnetic field, the modulated RF signal, or the modulated infra-red light.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to systems, methods and apparatus for programming a replacement sensor after a defective sensor has failed at a customer location. Although this disclosure often describes the sensor as a magnetically-activated door or window sensor commonly used in the home security industry, the concepts described herein could be applied to other types of sensors using different sensing technologies, such as infra-red detection, vibration, sound, etc. and used in other industries, such as manufacturing or robotics, for example. For the purpose of the discussions herein, the term "sensor" means any device used to monitor and report a state, a physical condition, an attribute, a status, or a parameter of something being monitored, such as a door, window, open space, room, a gate, etc. Examples of sensors comprise door and window sensors, motion detectors, passive infrared detectors, sound detectors, light interruption detectors, etc.

The inventive concepts described herein comprise a sensor that is specially programmed to enter a programming mode of operation the sensor detects a command received via a transducer that is normally used to detect a condition, state, status, etc. For example, when the sensor comprises a magnetic door/window sensor, the magnetic door/window sensor may receive a command to enter the programming mode of operation when its reed switch is toggled a predetermined number of times as it senses a modulated magnetic field. In another example, when the sensor comprises an infra-red sensor, the infra-red sensor may receive a command to enter the programming mode of operation when its infra-red detector detects that infra-red light is being toggled a predetermined number of times as it senses modulated infra-red light. Once in the programming mode, the sensor can receive sensor data from an external source, such as a dedicated, portable programming device, to add, delete and/or modify sensor data stored in a memory of the sensor. The sensor data may comprise a serial number of a defective sensor. By programming a replacement sensor with the defective sensor's serial number, the replacement sensor does not need to be learned into a security panel and will operate as if the defective sensor is still operating as usual.

Figure 1:
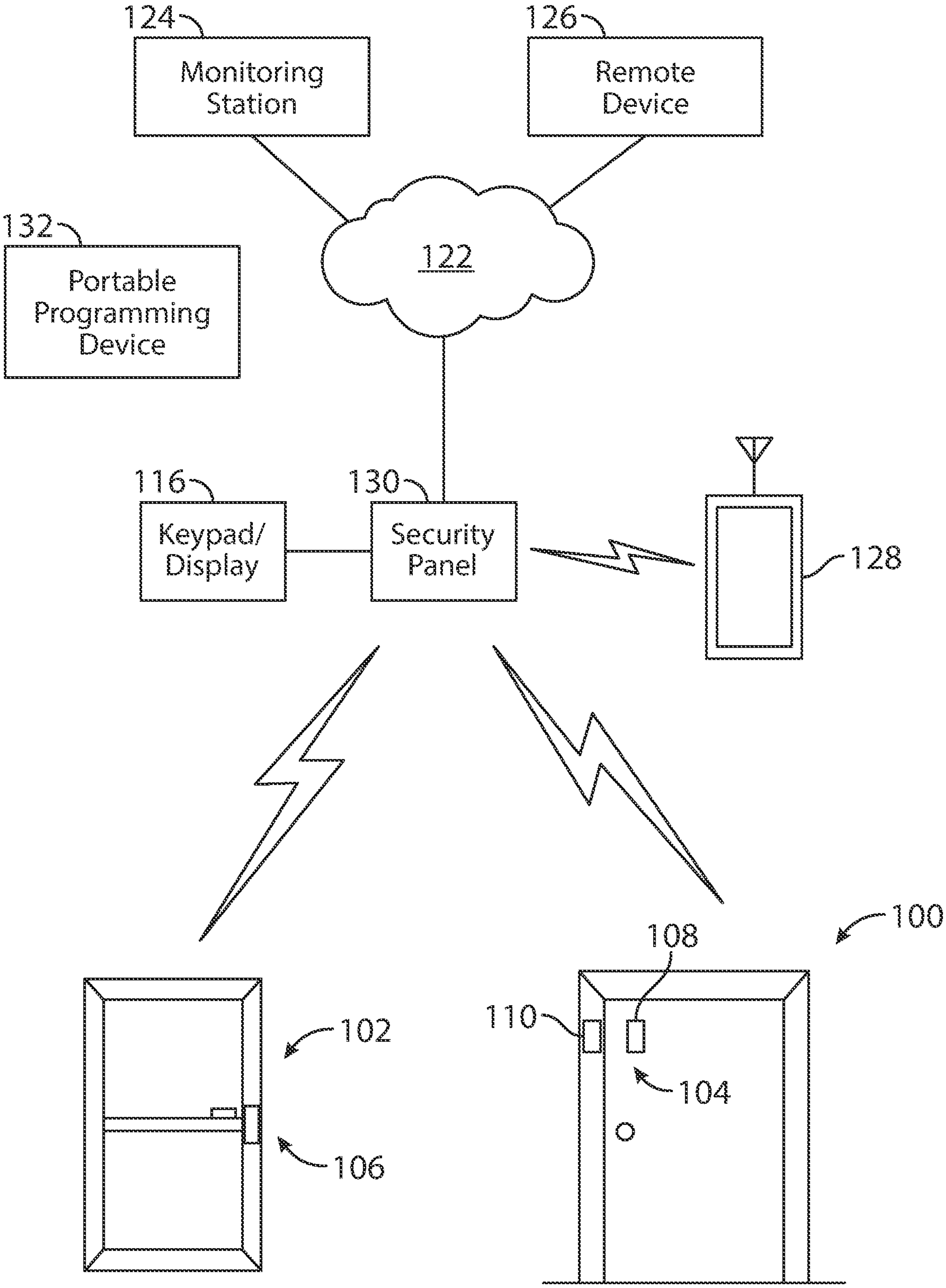
FIG. 1 is an illustration of a security system in accordance with one embodiment of the principles discussed herein.

FIG. 1 is an illustration of a security system in accordance with one embodiment of the principles discussed herein. In this embodiment a door assembly 100 and a window assembly 102 are monitored by sensors 104 and 106, respectively. Sensor 104 comprises magnet 108 mounted to door 112 and reed switch assembly 110 mounted to door frame 114, while sensor 106 comprises a magnet-less type sensor, as described above.

Each of the sensors communicates with security panel 130, typically using wireless RF signals. For example, if door 112 is opened, reed switch assembly 110 detects a reduction or elimination of a magnetic field produced by magnet 108 as magnet 108 moves away from reed switch assembly 110 as door 112 is opened. In response, reed switch assembly 110 transmits a message to security panel 130 indicative of a local alarm condition, e.g., door 112 has been opened.

In some embodiments, security panel 130 may send messages to the sensors requesting a status of a door or window being monitored, e.g., either "open" or "closed". In response, a sensor may transmit a response to security panel 130 indicating a status of the door or window, as the case may be. Other commands may be transmitted by security panel 130, such as "sound alarm", "turn on lights", open gate, lock doors, etc.

As described above, security panel 130 performs monitoring of sensors 104, 106, and other security devices (for example, a tilt sensor, shock sensor, motion detector, passive infra-red detector, light interruption detector, etc.) that may be part of the security system. In addition, security panel 130 generally provides status information to one or more keypad/displays 116, generally providing visual indications of the status of the security system or individual sensors. Security panel 130 allows users to interface with the security system to receive status information via keypad/display 116 and to control operation of the security system. Users may, alternatively or in addition, provide information to, and receive information from, security panel 130 via a wireless communication device 128 (such as a smartphone, tablet computing device, or other mobile computing device) and/or a remote device 126 (such as a fixed or portable computer, smartphone, tablet computing device, or other mobile computing device) via a wireless or wired communication channel with network 122.

Security panel 130 may also be in communication with an off-site remote monitoring station 124 via communication network 122, such as the Internet, PSTN, a fiber optic communication network, a wireless communication network (e.g., cellular, data, satellite, etc.), and/or other wide-area network. Remote monitoring station 124 typically provides security monitoring services for homes and businesses equipped with security systems such as the one shown in FIG. 1. Remote monitoring station 124 is adapted to receive communications from security panel 130 via network 122 in response to security panel 130 receiving an indication of a local alarm condition being sensed by one or more sensors/sensors in the security system. In other embodiments, security panel 130 simply receives raw data from the sensors and determines, based on the data, whether a local alarm condition has occurred. When a local alarm condition is detected, security panel 130 generates a system alarm which may comprise taking one or more actions, such as notifying remote monitoring station 124 that a local alarm condition has occurred, illuminating one or more lights, sounding one or more audible alerts, etc.

Also shown in FIG. 1 is portable programming device 132 which is used to program a replacement sensor with new or updated sensor data, such as a serial number, a model number, a sensor type, (i.e., door/window, door, window, door/window with bypass, etc.), or updated firmware. Portable programming device 132 may comprise a dedicated electronic device, having a user interface for manually entering the sensor data or providing the sensor data to portable programming device 132 using wired or wireless means from a separate electronic device, such as a mobile phone, portable computer, etc. In another embodiment, programming device 132 comprises a transducer module that is connected to a computing device, such as a laptop computer, tablet computer, smart phone, etc. In this embodiment, the computing device executes processor-executable instructions that cause the computing device to receive sensor data from a user and display programming status information to a user. The computing device connects with the transducer module via a communication cable, such as a USB cable, or via wireless communications to provide the sensor data to the transducer module, where the transducer module then modulates a magnetic field, an radio-frequency (RF) signal, infra-red light, or some other property generated by the transducer module that is capable of being sensed by a sensor to be programmed. For example, a smart phone may receive sensor data from a user, then send the sensor data to the transducer module. The transducer module then modulates a magnetic field produced by the transducer module based on the sensor data. A replacement door sensor senses the modulated magnetic field using its reed switch, which demodulates the modulated magnetic field into an electronic signal representative of the sensor data. The door sensor then stores the sensor data in a memory for use in a normal mode of operation.

Figure 2:
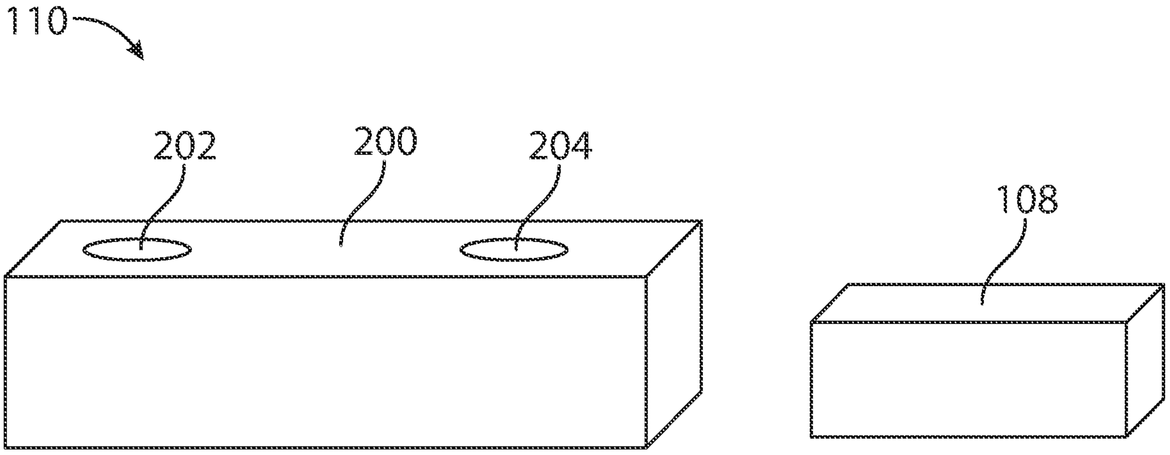
FIG. 2 is a perspective view of one embodiment of a sensor in accordance with the teachings herein, comprising a magnet and a reed switch module.

FIG. 2 is a perspective view of one embodiment of a sensor in accordance with the teachings herein, comprising magnet 108 and reed switch module 110. Reed switch module comprises housing assembly 200 that covers a reed switch, electronic circuitry, and a battery (not shown) used, in a normal mode of operation, to detect the presence or absence of a magnetic field produced by magnet 108 and to transmit information to security panel 130 relating to the status of a door or window.

The sensor shown in FIG. 2 further may comprise a user input device 202 for use in controlling functions of the sensor, such as "bypassing" the sensor (i.e., temporarily disabling the sensor) an/or entering a programming mode of operation, as will be discussed later herein. Such a device may comprise a mechanical switch (i.e., pushbutton, momentary pushbutton, toggle, slide, etc.), an opto-electrical switch, a heat sensing device (to detect the presence of a human finger), a capacitive sensor, or any other type of switch or sensor to provide an indication to the sensor of that a user wishes to temporarily disarm the sensor and/or enter the programming mode of operation. It may be desirable to temporarily disarm the sensor if a user wishes to, for example, open a door or window without having to disarm the entire security system at security panel 130. It may also be desirable to enter a programming mode of operation when swapping a defective sensor in an installed security system with a new sensor that would appear, to security panel 130, to be the same sensor. In effect, entering the programming mode of operation acts to "clone" a defective sensor The sensor shown in FIG. 2 may further comprise status indicator 204, used to convey the status of the sensor as being armed or disarmed, the term "armed" referring to an ability to detect and/or report an event (e.g., movement of a door or window, closing/opening of a door or window, etc.), and the term "disarmed" referring to a condition where the sensor cannot detect and/or report an event. It may, alternatively or additionally, provide status information pertaining to a mode of operation that the sensor is currently operating under, i.e., either a normal mode of operation or a programming mode of operation, provide an indication when the sensor has successfully been programmed, and/or if the sensor was unable to be programmed. Status indicator 204 may comprise an LED, LCD, or any other device for providing a visual status of the sensor, or it may comprise a device capable of emitting audible tones, messages, alerts, etc., that also indicate a status of the sensor. In one embodiment, indicator 204 comprises a multi-color LED, for example an LED package that is able to produce red light and a green light, red for indicating that the sensor is disabled and green for indicating that the sensor is armed. Alternatively, indicator 204 could produce a yellow light when the programming mode of operation is entered, a green light when the sensor has been successfully programmed and/or a red light if the sensor was not successfully programmed. Of course, other colors may be used to convey this information. In other embodiments, two or more visual indicators may be used to convey this information.

Figure 3A:
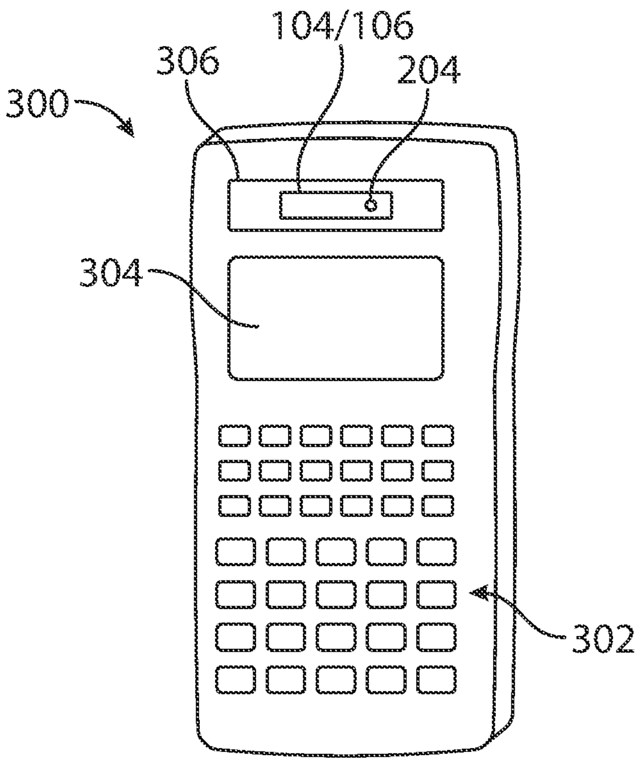
FIG. 3*a* illustrates one embodiment of the portable programming device shown in FIG. 1.

FIG. 3*a* illustrates one embodiment of portable programming device 132. In this embodiment, portable programming device 132 comprises a stand-alone programming device 300, comprising a keypad 302, a display 304, and an optional programming area 306. In operation, a new sensor for the security system, such as sensor 104 or 106, is placed in optional programming area 306, for example a designated area on the surface of stand-alone programming device 300. Proximate to optional programming area 306, typically within stand-alone programming device 300 underneath optional programming area 306, is located a transducer that modulates an emission or property, such as a magnetic field, an RF signal, infra-red light, or some other emission or property generated by the transducer, that is detectable by the sensor. For example, if the sensor comprises a magnetic reed switch module, the transducer will comprise an iron core wrapped by a coated, conductive wire that acts as an electro-magnet when current runs through the wire. Once the sensor is in place on optional programming area 306, a user of stand-alone programming device 300 may use keypad 302 provide a command to the programming device for the sensor to enter a programming mode of operation. The command causes the transducer to modulate an emission or property of the transducer, such as an emitted magnetic field, in accordance with the command. For example, the command may comprise of a series of eight successive on-off pulses within a predetermined time period, such as 4 seconds. The sensor may activate status indicator 204 after the sensor has received the command and when the sensor has determined that the sensor has entered the programming mode of operation. In response, the user may enter sensor data (i.e., a sensor model number, a serial number, manufacturer identification code, etc.) using keypad 302, where stand-alone programming device 300 uses the sensor data to modulate the transducer emission/property, thus causing a detector within the sensor to change state as it detects the changes in the emission/property emitted by the transducer. For example, the transducer may comprise a core/wire that emits a modulated magnetic field in accordance with the sensor data, where a reed switch internal to the sensor detects the modulated magnetic field and re-produces the sensor data in electronic form for use by the sensor.

In another embodiment, the sensor data comprises updated firmware, and then the updated firmware is provided to the sensor by modulating the emission/property from the transducer in accordance with the firmware. For example, if the sensor comprises a reed switch, modulation of the magnetic field emitted by the transducer causes the reed switch to change state (i.e., from open to closed or closed to open) in conformity with the magnetic field modulation produced by the transducer, just as the reed switch changes state when the reed switch detects removal/detection of a magnetic field caused by a magnet located on a door or window when the door or window is opened or closed, respectively.

When the sensor data has successfully been programmed into the sensor, as determined by the sensor, the sensor may provide an indication, via status indicator 204, that the sensor data has been successfully programmed.

In another embodiment, optional programming area is not used, wherein stand-alone programming device 300 is simply held in close proximity to a sensor to be programmed.

Figure 3B:
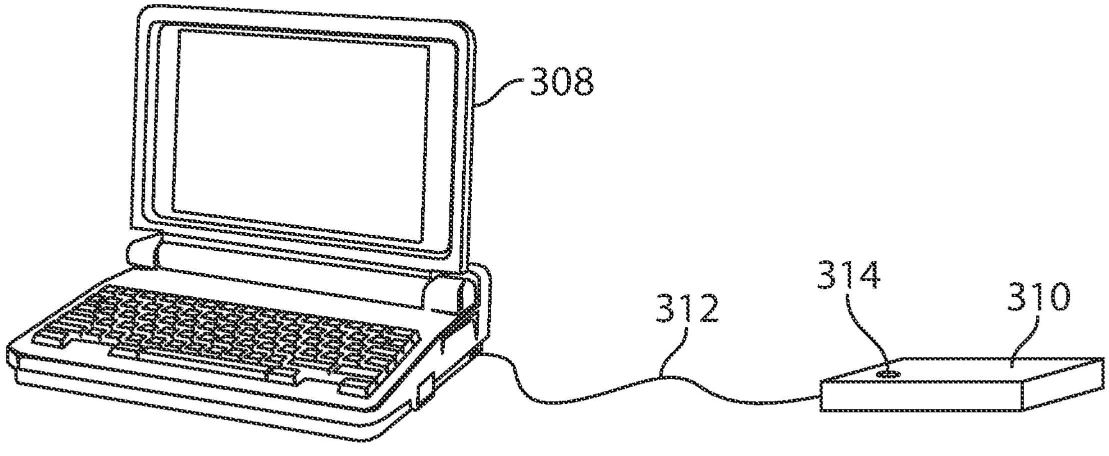
FIG. 3*b* illustrates another embodiment of the programming device shown in FIG. 1 as a transducer module coupled to a computing device.

FIG. 3*b* illustrates another embodiment of programming device 132, this time comprising a system comprising computing device 308 coupled to a transducer module 310 via a cable 312. In another embodiment, cable 312 is not used, and computing device 308 communicates with transducer module 310 via well-known short-range wireless technology, such as Wi-Fi or Bluetooth technology.

Computing device 308 executes a software application that allows a user of computing device 308 to program a sensor. The user launches the software application that may query the user to begin a programming process by pressing a predetermined key on computing device 308. Computing device 308 may comprise a laptop computer, tablet computer, smart phone, or some other portable computing device. The user may press the key(s) after a new sensor to be programmed is placed on top of transducer module 310, which generates a command for the sensor to enter a programming mode of operation. The command is sent to the transducer module via cable 312 or wireless means, where an internal transducer of transducer module 310 modulates an emission/property generated by the internal transducer in conformance with the command. The modulated command is detected by the sensor and demodulated to re-produce the command for placing the sensor into the programming mode of operation.

Computing device 308 may query the user when the sensor has indicated that it has entered the programming mode of operation, whereby the user may be prompted to enter sensor data into computing device 308. Once the sensor data has been entered, the user may be prompted by the software application to send the sensor data to the transducer module for modulation by the internal transducer. The modulated sensor data is detected by the sensor and stored in a memory therein and used in the normal mode of operation, for example, when the sensor sends an alarm signal to security panel 130. In one embodiment, the sensor transmits is serial number along with the alarm signal in order for security panel 130 to determine which sensor sent the alarm signal.

Figure 4:
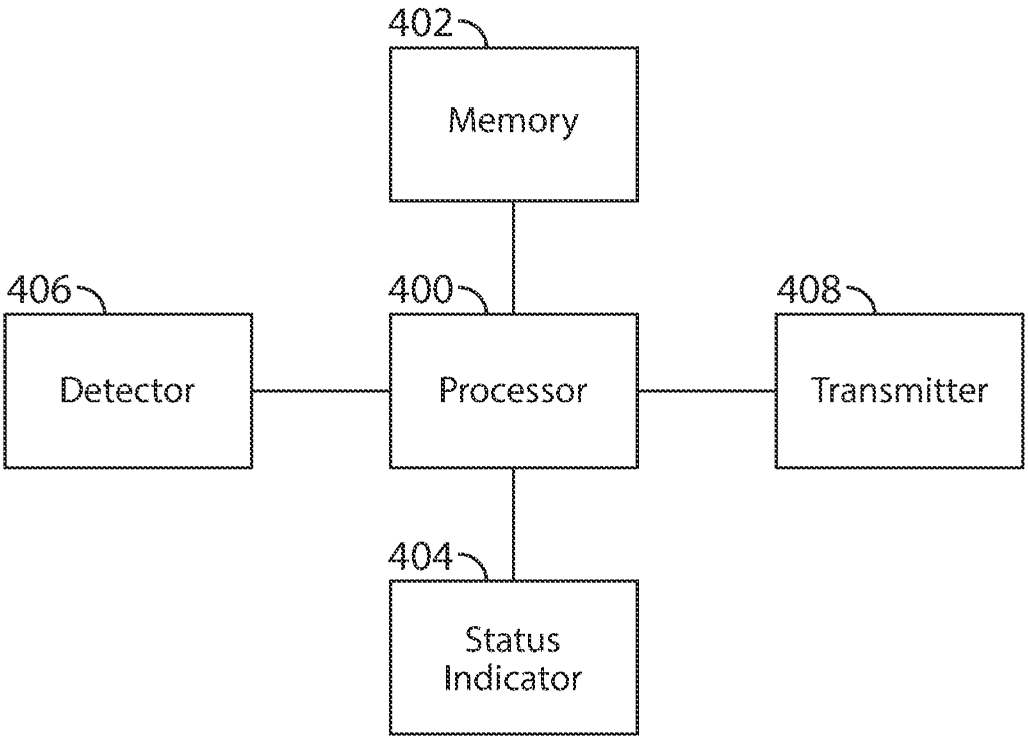
FIG. 4 is a functional block diagram of one embodiment of a sensor in accordance with the teachings herein and shown in FIG. 1.

FIG. 4 is a functional block diagram of one embodiment of a sensor, such as sensor 104, sensor 106, or some other sensor, such as an infra-red sensor, in accordance with the teachings herein. The term "sensor", as used herein, is meant to refer to a device that not only detects a change in a condition, state, status, etc. of a thing or place being monitored, but also comprises a transmitter for transmitting an indication to a remote location when a change occurs in the monitored condition, state, status, etc. This term is used as opposed to the term "detector" which refers to a component of a sensor that performs the actual sensing of an emission or property that determines a condition, state, status, etc. For example, in sensor 104 or 106, the sensor comprises at least the reed switch module which, in turn, comprises a detector in the form of a reed switch.

FIG. 4 shows processor 400, memory 402, detector 404, transmitter 406, and status indicator 204. It should be understood that not all of the functional blocks shown in FIG. 4 are required for operation of the sensor (for example, status indicator 204 may not be necessary), that the functional blocks may be connected to one another in a variety of ways, and that not all functional blocks are necessary for operation of the sensor are shown (such as a power supply), for purposes of clarity.

Processor 400 is configured to provide general operation of the sensor by executing processor-executable instructions stored in memory 402, for example, executable code. Processor 400 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively.

Memory 402 comprises one or more information storage devices, such as RAM, ROM, EEPROM, UVPROM, flash memory, SD memory, XD memory, or other type of electronic, optical, or mechanical memory device. Memory 402 is used to store processor-executable instructions for operation of the sensor as well as any information used by processor 400, such as threshold information to determine a status, state, or condition, identification information (i.e., a serial number), current or previous door or window status information, instructions for providing audible or visual alerts, etc. The instructions cause the sensor to enter a programming mode of operation when a command to do so is received from programming device 132 and to program the sensor with sensor data received from programming device 132.

Detector 404 is coupled to processor 400 and monitors a state, physical condition, attribute, status, emission, property or parameter of something, such as the status of a door, window, or gate (e.g., "open", "closed", "locked", "unlocked", "movement detected", etc.), lamp or siren (e.g., "on" or "off"), motion detector ("motion detected" or "no motion detected"), whether a room is occupied ("yes", "no", "1", "0", etc.), whether movement is detected in a predetermined area or volume ("motion detected" or "no motion detected"), etc. Detector 404 may comprise a reed switch, a motion detector module, an infrared detector module, an audio detector module, a tilt sensor module, a switch, a light interruption detector, an accelerometer, a gyroscope, an angle sensor, or other sensor module to detect a change in an emission or property or otherwise a change in an environment in which the sensor is located.

User input 410 is used for temporarily disarming the sensor, comprising one or more mechanical switches (i.e., pushbutton, momentary pushbutton, toggle, slide, etc.), opto-electrical switches, heat sensing devices (to detect the presence of a human finger), capacitive sensors, or any other type of switch or sensor to provide an indication to the sensor that a user wishes to temporarily disarm the sensor.

Status indicator 204 is used to convey status information of the sensor, such as whether the sensor is in a programming mode of operation and/or when the sensor has been successfully programmed, or not. Status indicator 204 may comprise an LED, LCD, or any other device for providing a visual status of the sensor, or it may comprise a device capable of emitting audible tones, messages, alerts, etc., that also indicate a status of the sensor. In one embodiment, indicator 204 comprises a multi-color LED. In other embodiments, two or more visual indicators may be used to convey status.

Transmitter 406 comprises circuitry necessary to wirelessly transmit messages and other information from the sensor to security panel 130, either directly or through in intermediate device, such as a repeater, commonly used in popular mesh networks. Such circuitry is well known in the art and may comprise BlueTooth, Wi-Fi, RF, optical, ultrasonic circuitry, among others. Alternatively, or in addition, transmitter 406 comprises well-known circuitry to provide signals to security panel 130 via wiring, such as telephone wiring, twisted pair, two-conductor pair, CAT wiring, AC home wiring, or other type of wiring.

In normal operation, processor 400 executes processor-executable instructions stored in memory 402 that causes the sensor to detect a modulated emission or property, enter a programming mode of operation, receive sensor data from programming device 132, store the new sensor data and use it during a normal mode of operation (i.e., to send the sensor's serial number during a transmission to a remote location), enter into a normal mode of operation, and monitor the status or condition of thing or place, and transmit an alarm signal when a change in the status or condition is detected. In the normal mode of operation, processor 400 uses signals from detector 404 to determine whether an alarm condition has occurred, such as a door or window changing state from "closed" to "open", a light being turned on, motion being sensed, etc. If processor 400 determines that an alarm condition has occurred, an alarm message is generated and transmitted to a remote location, such as security panel 130. In one embodiment, the alarm message comprises a notification to security panel 130 that an alarm condition has been detected by detector 404 and an identification of the sensor, typically by serial number.

In a programming mode of operation, processor 400 executes the processor-executable instructions stored in memory 402 that causes the sensor to enter the programming mode of operation from the normal mode of operation, receive sensor data from programming device 132, provide indications that indicate when the sensor is in the programming mode of operation, update sensor data and/or the processor-executable instructions stored in memory 402, provide an indication when the sensor has successfully updated the sensor data and/or processor-executable instructions, and return to the normal mode of operation.

Figure 5:
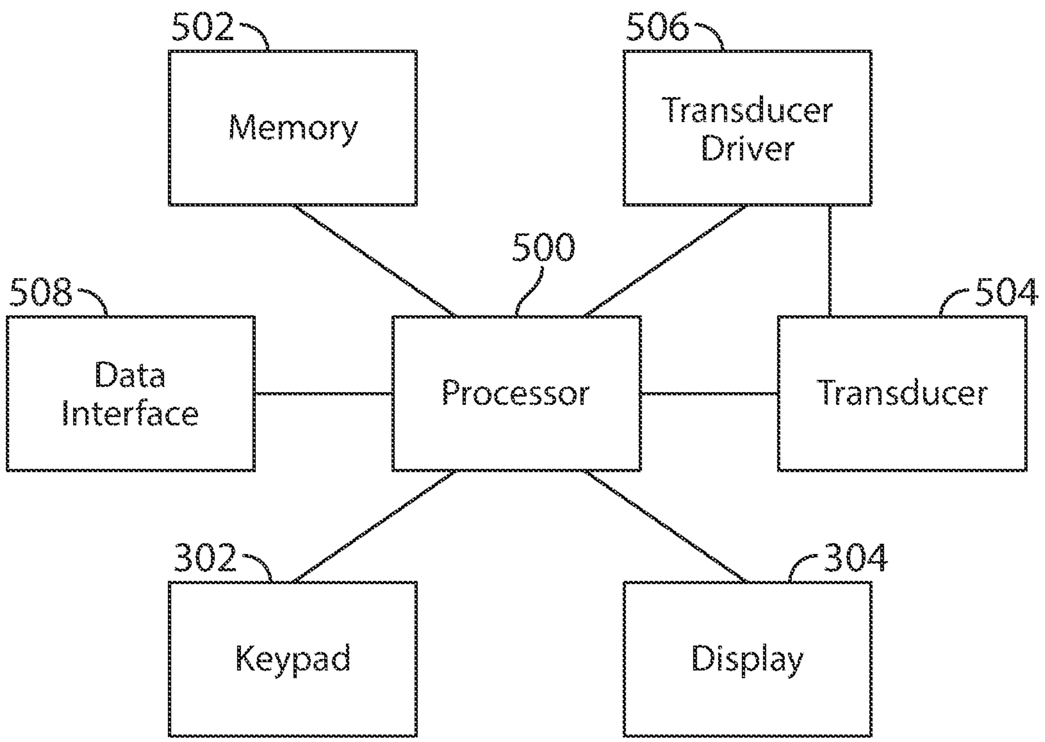
FIG. 5 is a functional block diagram of one embodiment of the programming device shown in FIG. 3*a;*

FIG. 5 is a functional block diagram of one embodiment of programming device 132, comprising stand-alone programming device 300 as shown in FIG. 3*a*.

FIG. 5 shows processor 500, memory 502, transducer 504, transducer driver 506, data interface 508, keypad 302, and display 304. It should be understood that data interface 508 is an optional component and that the functional blocks may be connected to one another in a variety of ways, and that some functionality is not shown (such as a power supply), for purposes of brevity and clarity.

Processor 500 is configured to provide general operation of stand-alone programming device 300 by executing processor-executable instructions stored in memory 502, for example, executable code. Processor 500 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively.

Memory 502 comprises one or more information storage devices, such as RAM, ROM, EEPROM, UVPROM, flash memory, SD memory, XD memory, or other type of electronic, optical, or mechanical memory device. Memory 502 is used to store processor-executable instructions for operation of stand-alone programming device 300 as well as any information used by processor 500, such as sensor data received via data interface 508 and/or keypad 302.

Transducer 504 creates a modulated emission or property, such as a magnetic field, an RF signal, or infrared-light, that can be sensed by a sensor to be programmed. For example, if the sensor is a reed switch module, transducer 504 may comprise an iron core wrapped with insulated wire that creates a modulated magnetic field detectable by a reed switch module. If the sensor is an infra-red sensor, transducer 504 comprises an infra-red transmitter that creates modulated infra-red light detectable by the infra-red sensor. The emission or property from transducer 504 is modulated by a command to enter the programming mode of operation or by the sensor data.

Transducer driver 506 comprises circuitry to electronically drive transducer 504 that causes transducer 504 to generate the modulated emission or property. Such circuitry may comprise well known circuitry such as a transistor or an operational amplifier. Transducer driver 506 receives the command to enter the programming mode of operation or the sensor data via data interface 508, keypad 302, or processor 500 and produces a modulated electronic output signal in accordance with the command or sensor data. In one embodiment, the electronic output signal comprises a "high power" replica of the command or sensor data with enough current to drive transducer 504. For example, if the sensor data comprises a series of 1-0-1-1-0-0-0-1, transducer driver 506 produces a modulated electronic output signal that replicates the series with enough current to drive transducer driver 506, as typically the sensor data from data interface 508, keypad 302 or processor 500 is limited in its ability to drive transducer 506. In another embodiment, transducer driver 506 is not used when data interface 508, keypad 302, and/or processor 500 is capable of electronically driving transducer 504 directly.

Data interface 508 allows sensor data to be received from an external source, such as a portable computer, for providing sensor data from a source other than keypad 302. Data interface 508 may be used in situations where sensor firmware is updated. Sensor data received over data interface 508 is typically stored in memory 502 until it is used by processor 500 to program a sensor. Alternatively, the sensor data from data interface 508 is not stored in memory 502, where it may be provided directly from data interface 508 to transducer driver 506.

Figure 6:
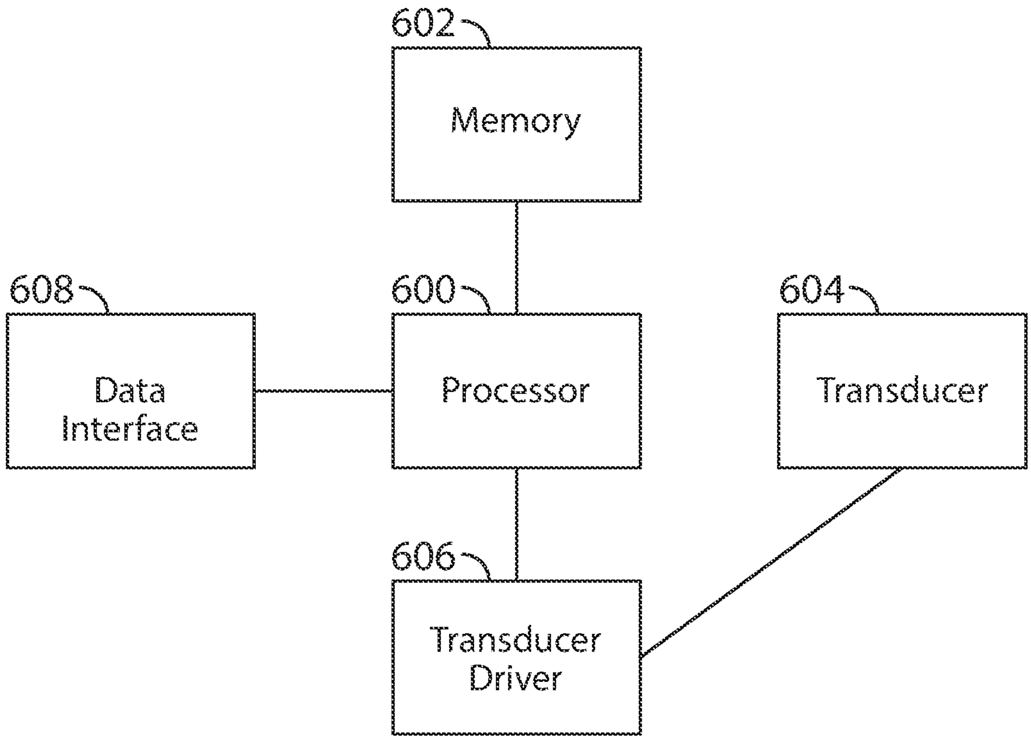
FIG. 6 is a functional block diagram of one embodiment of the transducer module shown in FIG. 3*b;*

FIG. 6 is a functional block diagram of one embodiment of a transducer module 310 for use with computing device 308 for programming a sensor at a customer location, as shown in FIG. 3*b*. FIG. 6 illustrates the functional components of transducer module 310, which acts as one embodiment of programming device 132. In a related embodiment, cable 312 is not utilized, and computing device 308 communicates with transducer module 310 via well-known wireless means, such as Wi-Fi or Bluetooth circuitry.

FIG. 6 shows processor 600, memory 602, transducer 604, transducer driver 606, and data interface 608. In another embodiment, only transducer 604 and transducer driver 606 are used. In yet another embodiment, only transducer 604 is used in applications where no driving circuitry is needed to drive transducer 604. It should be understood that the functional blocks shown in FIG. 6 may be connected to one another in a variety of ways.

Processor 600 is configured to provide general operation of programming device 132 by executing processor-executable instructions stored in memory 602, for example, executable code. Processor 600 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively.

Memory 602 comprises one or more information storage devices, such as RAM, ROM, EEPROM, UVPROM, flash memory, SD memory, XD memory, or other type of electronic, optical, or mechanical memory device. Memory 602 is used to store processor-executable instructions for operation of transducer module 310, as well as any information that may be used by processor 500, such as sensor data received via data interface 608.

Transducer 604 creates a modulated emission or property, such as a magnetic field, an RF signal or infrared-light that is modulated by the command to enter the programming mode of operation or the sensor data and that can be detected by a sensor to be programmed. Transducer 604 may comprise two or more separate transducers in an embodiment where transducer module 310 is configured to produce more than one type of emission or property. When a sensor to be programmed comprises, for example, a reed switch module, transducer 604 may comprise an iron core wrapped with insulated wire that creates the modulated magnetic field detectable by the reed switch module in order to program the reed switch module with the sensor data. If the sensor is an infra-red detector, transducer 604 comprises an infra-red transmitter that creates modulated infra-red light detectable by an infra-red detector in order to program an infra-red sensor. Such circuitry, for these embodiments, is well known in the art.

Transducer driver 606 comprises circuitry to drive transducer 604 that causes transducer 604 to generate a "high power" electronic signal that causes transducer 604 to generate a modulated magnetic field or modulated infra-red light. Such circuitry may comprise well known circuitry such as a transistor or an operational amplifier. In one embodiment, transducer driver 606 receives the sensor data directly from data interface 608, without the use of processor 600 or memory 602, and produces an output signal that is modulated by the sensor data. In another embodiment using processor 600 and memory 602, transducer driver 606 receives the sensor data from processor 600. As an example, if the sensor data comprises a sequence of digital data in the form of 1-0-1-1-0-0-0-1, transducer driver 606 produces an output signal that replicates this sequence with enough current to drive transducer driver 606, as typically the sensor data from data interface 608 is limited in its ability to drive transducer 606. In another embodiment, transducer driver 606 is not used when data interface 608 is capable of electronically driving transducer 604 directly.

Data interface 608 allows sensor data to be received from an external source, such as computing device 308, using well-known wired or wireless communication circuitry, such as Ethernet, Wi-Fi, Bluetooth, USB, etc.

Figure 7:
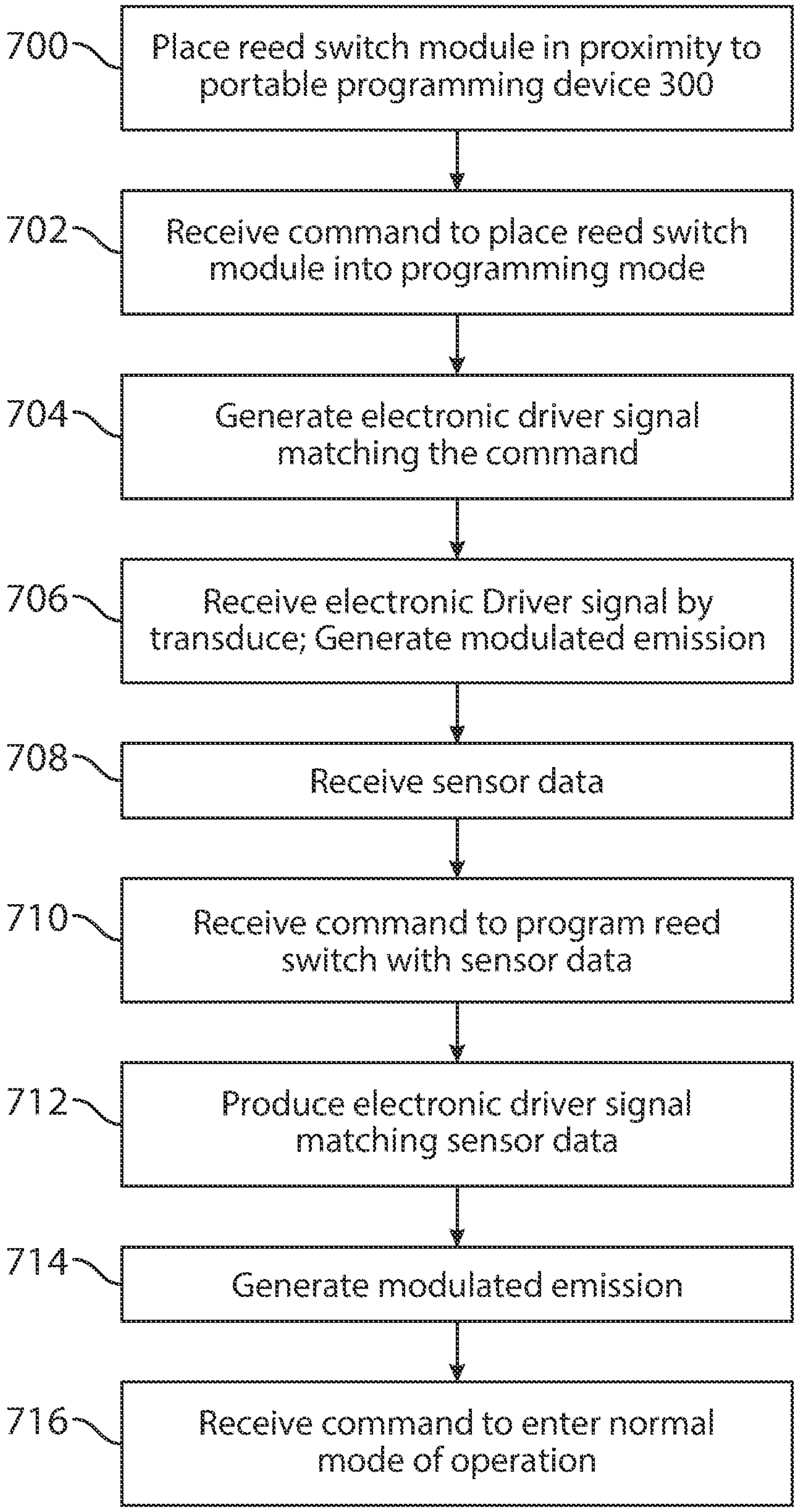
FIG. 7 is a flow diagram illustrating one embodiment of a method performed by the portable programming device shown in FIG. 3*a;*

FIG. 7 is a flow diagram illustrating one embodiment of a method for programming a sensor at a customer location or "in the field". Reference is made to stand-alone programming device 300 for programming a reed switch module. It should be understood that in other embodiments, a sensor other than a reed switch module may be programmed and that in some embodiments, not all of the steps shown in FIG. 7 are performed. It should also be understood that the order in which the steps are carried out may be different in other embodiments. The method may be performed, for example, when a defective sensor is replaced by a replacement sensor of the same or similar model.

At block 700, the reed switch module is placed in proximity to stand-alone programming device 300. In one embodiment, either programming device comprises optional programming area 306 of where to place the reed switch module or where stand-alone programming device 300 should be held in proximity to the reed switch module.

At block 702, a user of stand-alone programming device 300 enters a command into stand-alone programming device 300 using keypad 202. The command is an instruction for the reed switch module to enter a programming mode of operation. The command is received by processor 500, where it is then provide to transducer driver 506 or, in another embodiment, directly to transducer 504.

At block 704, transducer driver 506 receives the command from processor 500 and, in response, produces an electronic driver signal that drives transducer 504 in conformance with the command. In one embodiment, the electronic driver signal from transducer driver 506 comprises a digital signal that matches the command from processor 500, but having enough current to drive transducer 504.

At block 706, transducer 504 receives the electronic driver signal from transducer driver 506 and, in response, generates a magnetic field modulated in accordance with the signal from transducer driver 506. For example, when the signal from transducer driver 506 is a "1", transducer 504 generates a magnetic field. When the signal from transducer driver 506 is a "0", transducer 504 ceases to generate the magnetic field (or reduces the field to a level where it is not detectable by the reed switch module).

At block 708, after the reed switch module has entered the programming mode of operation, the user may enter sensor data into stand-alone programming device 300 via keypad 302. Such sensor data may comprise a serial number matching a defective reed switch module in need of replacement. The serial number is obtained by the user by viewing it on or inside the defective reed switch module or by obtaining the serial number from a professional security monitoring or installation company. Such companies typically record each sensor's serial number as the sensors are "learned" into security panel 130. The user may obtain this information by voice call, text message, email, etc.

The sensor data may, additionally or alternatively, comprise a model number, a manufacture ID code, a manufacturing date code, or any other information pertinent to the reed switch module.

The sensor data may, additionally or alternatively, comprise a firmware update for the reed switch module. In this embodiment, the volume of data is generally too large for it to be manually entered by the user, so the user may provide the updated firmware to stand-alone programming device 300 via data interface 508. For example, the user may have the updated firmware stored in the user's mobile phone and then send the updated firmware to stand-alone programming device 300 over-the-air via data interface 508 using Bluetooth technology. In this embodiment, the updated firmware may be stored in memory 502 by processor 500 or sent directly by processor 500 to transducer driver 506.

At block 710, the user causes the sensor data to be provided to the reed switch module by entering a command into stand-alone programming device 300 via keypad 302. This command causes processor 500 to send the updated firmware to transducer driver 506, where it is used to produce a magnetic field in conformance with the sensor data, capable of electronically driving transducer 504.

At block 712, transducer driver 506 receives the sensor data from processor 500 and, in response, produces an electronic driver signal that drives transducer 504 in conformance with the sensor data. In one embodiment, the signal from transducer driver 506 comprises a digital signal that matches the sensor data from processor 500, but having enough current to drive transducer 504. The term "matching" as used herein means that a waveform of the electronic driver signal is the same as a waveform of the sensor data. In other words, if the sensor data is a string of 1's and 0's, the electronic driver signal comprises the same string of 1's and 0's.

At block 714, transducer 504 receives the signal from transducer driver 506 and, in response, generates a magnetic field, modulated in accordance with the signal from transducer driver 506. For example, when the signal from transducer driver 506 is a "1", transducer 504 generates a magnetic field. When the signal from transducer driver 506 is a "0", transducer 504 ceases to generate the magnetic field (or reduces the fields to a level where it is not detectable by the reed switch module).

At block 716, in one embodiment, after the reed switch module has been programmed with the sensor data, the user may enter a command into stand-alone programming device 300 via keypad 302 to the reed switch module for the reed switch module to enter a normal mode of operation. In the normal mode of operation, the reed switch module changes state when it detects that a magnetic field from magnet 108, for example, is no longer detectable, and transmits a signal to security panel 130 as an indication of such. The command to place the reed switch assembly into the normal mode of operation follows the same sequence as described above with respect to providing a command to enter the programming mode of operation, above.

Figure 8:
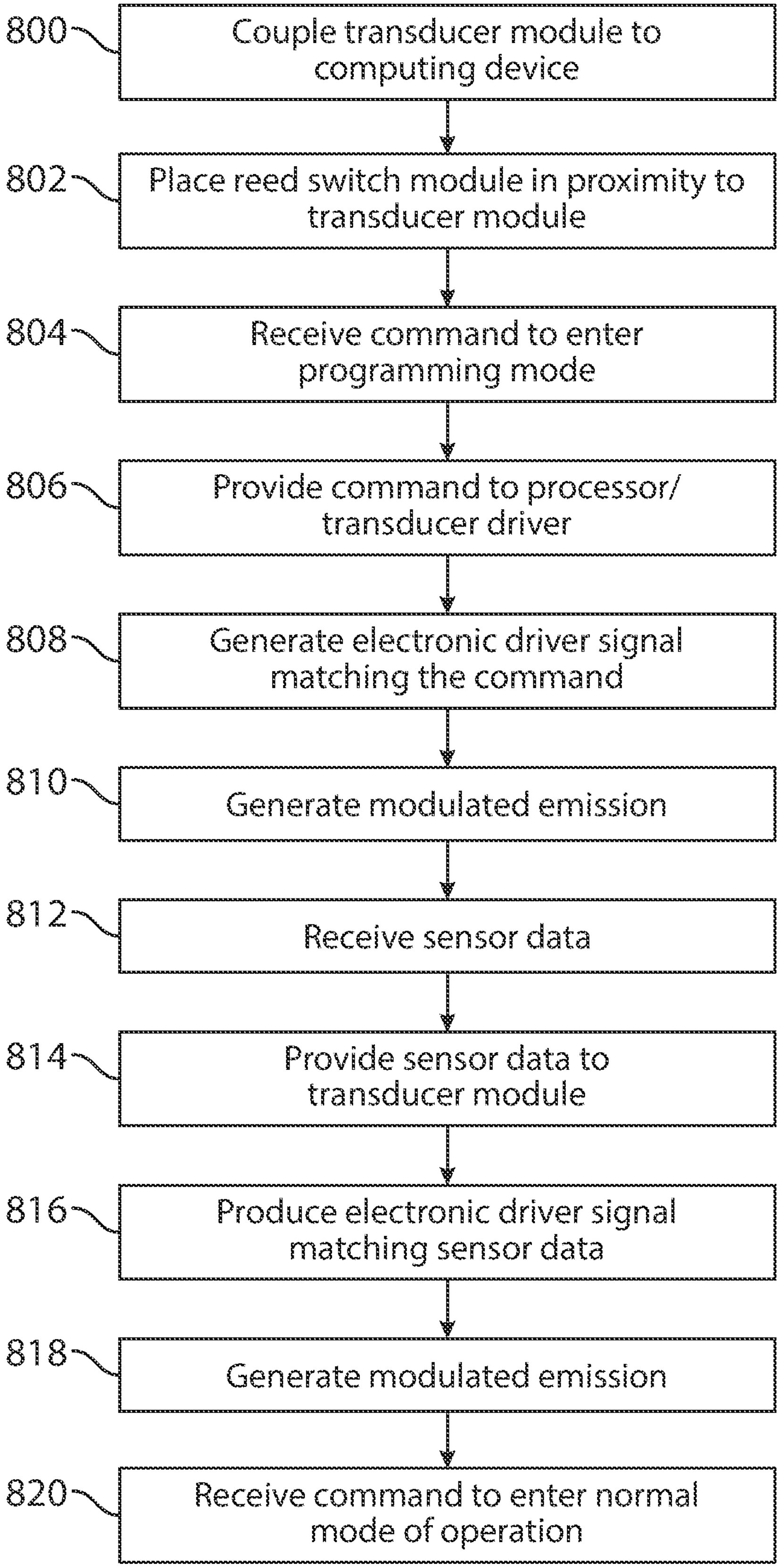
FIG. 8 is a flow diagram illustrating one embodiment of a method performed by the transducer module shown in shown in FIG. 6.

FIG. 8 is a flow diagram illustrating another method for programming a sensor at a customer location or "in the field". Reference is made to the embodiment shown and described by FIG. 6, using computing device 308 coupled to transducer module 310. It should be understood that in some embodiments, not all of the steps shown in FIG. 8 are performed. It should also be understood that the order in which the steps are carried out may be different in other embodiments.

At block 800, transducer module 310 is coupled to computing device 308 via well-known wired or wireless means. A user of computing device 308 may launch a software application resident on computing device 308 for programming the reed switch module. The software program may query the user to place the reed switch module in proximity to transducer module 310.

At block 802, the reed switch module is placed in proximity to transducer module 310. In one embodiment, transducer module 310 comprises optional programming area 306 of where to place the reed switch module or where transducer module should be held in proximity to the reed switch module.

At block 804, a user of computing device 308 enters a command into computing device 308. The command is an instruction for the reed switch module to enter a programming mode of operation. The programming mode of operation allows the reed switch module to receive new or updated sensor data. The command is received by processor 600, where it is then provide to transducer module 308 via cable 312 or wireless means. The command comprises a digital signal that is recognized by the reed switch module to enter the programming mode of operation.

At block 806, the command is received by data interface 608 and, in one embodiment, provided to processor 600. In another embodiment, the command is provided directly to transducer driver 606.

At block 808, transducer driver 606 receives the command from processor 600 or data interface 608 and, in response, produces an electronic driver signal that drives transducer 604 in conformance with the command. In one embodiment, the electronic driver signal from transducer driver 606 comprises a digital signal that matches the command, but having enough current to drive transducer 604.

At block 810, transducer 604 receives the electronic driver signal from transducer driver 606 and, in response, generates a magnetic field modulated in accordance with the electronic driver signal from transducer driver 606. For example, when the electronic driver signal from transducer driver 606 is a "1", transducer 604 generates a magnetic field. When the electronic driver signal from transducer driver 606 is a "0", transducer 604 ceases to generate the magnetic field (or reduces the field to a level where it is not detectable by the reed switch module.

At block 812, after the reed switch module has entered the programming mode of operation, the user may enter sensor data into computing device 308. Such sensor data may comprise a serial number matching a defective reed switch module in need of replacement. The sensor data is typically stored in memory 1002 by processor 1000.

The sensor data may, additionally or alternatively, comprise a model number, a manufacturer ID code, a manufacturing data code, and/or other information pertinent to the reed switch assembly.

The sensor data may, additionally or alternatively, comprise a firmware update for the reed switch module. In this embodiment, the volume of data is generally too large for the firmware update to be manually entered by the user, so the user may provide the updated firmware to computing device 308 by connecting to a server over the Internet that stores the updated firmware, or by wired or wireless communications with a mobile device carried by the user, such as a smartphone or tablet computer.

At block 814, the user causes the sensor data to be provided to transducer module 310 by entering a command into computing device 308. This command causes computing device 308 to send the sensor data to transducer module 310, which receives it via data interface 608. Processor 600 receives the sensor data and either stores it in memory 602 and/or sends it to transducer driver 606, where it is used to produce an electronic driver signal in conformance with the sensor data and capable of electronically driving transducer 604. In another embodiment, the sensor data is provided directly to transducer driver 606 from data interface 608.

At block 816, transducer driver 606 receives the sensor data from processor 600 or from data interface 608 and, in response, produces an electronic driver signal that drives transducer 604 in conformance with the sensor data. In one embodiment, the signal from transducer driver 606 comprises a digital signal that matches the sensor data, but having enough current to drive transducer 604.

At block 818, transducer 604 receives the electronic driver signal from transducer driver 606 and, in response, generates a magnetic field, modulated in accordance with the electronic driver signal from transducer driver 606. For example, when the signal from transducer driver 606 is a "1", transducer 604 generates a magnetic. When the signal from transducer driver 606 is a "0", transducer 604 ceases to generate the magnetic field (or reduces the field to a level where it is not detectable by the reed switch module).

At block 820, in one embodiment, after the reed switch module has been programmed with the sensor data, the user may send a command to the reed switch module, via computing device 308 and transducer module 310, for the reed switch module to enter a normal mode of operation. In the normal mode of operation, the reed switch module changes state when it detects that a magnetic field from magnet 108, for example, is no longer detectable, and transmits a signal to security panel 130 as an indication of such.

Figure 9:
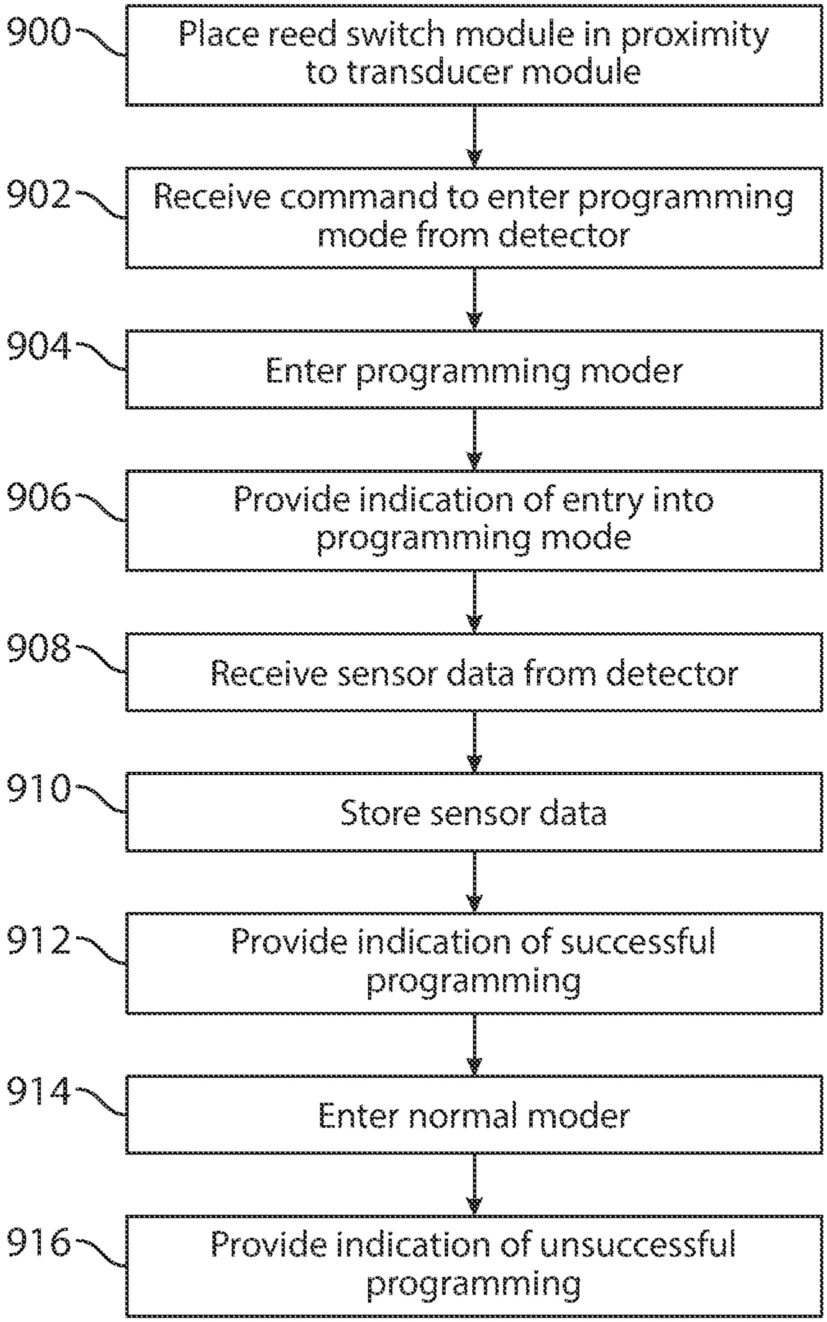
FIG. 9 is a flow diagram illustrating one embodiment of how a sensor shown in FIG. 1 operates during a programming operation.

FIG. 9 is a flow diagram illustrating how a sensor to be programmed operates during a programming operation. Reference is made to the sensor shown in FIG. 4, for example door sensor 104 using either the programming device shown in FIG. 3*a* or the computing device and transducer module shown in FIG. 3*b*. It should be understood that in some embodiments, not all of the steps shown in FIG. 9 are performed. It should also be understood that the order in which the steps are carried out may be different in other embodiments.

At block 900, the sensor is placed in proximity to stand-alone programming device 300 or transducer module 310. In one embodiment, transducer module 310 comprises optional programming area 306 of where to place the reed switch module or where transducer module should be held in proximity to the reed switch module.

At block 902, the sensor receives a command, via detector 404, from either stand-alone programming device 300 or transducer module 310, for the sensor to enter a programming mode of operation. The detector 404 detects changes in the output of transducer 504 or 604 and produces an electronic signal in conformity with the changes. For example, detector 404 changes state each time a magnetic field generated by an iron core wrapped in insulating wire changes from "on" or "present" to "off" or "not present", or from "off" or "not present" to "on" or "present". Detector 404 generates an electronic signal representative of the changes. For example, a magnetic field generated by transducer 504 or 604 is modulated in accordance with the command for the sensor to enter the programming mode of operation. Detector 404 detects the changes in the magnetic field, producing a signal that represents that re-produces the command. The electronic signal from detector 404 is then provided to processor 400.

At block 904, the electronic signal from detector 404 is received by processor 400, where processor 400 places the sensor into the programming mode of operation. The programming mode of operation typically halts a normal mode of operation, preventing the sensor from transmitting a signal when a change is detected by detector 404, while allowing the sensor to be programmed with new or updated sensor data, such as a new serial number or updated firmware.

At block 906, after the sensor has been placed into the programming mode of operation, processor 400 may cause status indicator 204 to provide an indication to the user that the sensor has entered the programming mode of operation.

At block 908, after the sensor has been placed into the programming mode of operation, the sensor receives sensor data, via detector 404, from either stand-alone programming device 300 or transducer module 310. Detector 404 detects changes in the output of transducer 504 or 604 and produces an electronic signal in conformity with the changes, as described above. The electronic signal is then provided to processor 400.

At block 910, processor 400 receives the sensor data and adds and/or modifies data stored in memory 402 in accordance with the received sensor data. For example, if the sensor data comprises a new serial number, processor 400 may replace an existing serial number with the new serial number in memory 402, where it may be later retrieved for identifying the sensor. If the sensor data comprises a firmware update, processor 400 updates the firmware stored in memory 402 using well-known techniques in the art.

At block 912, after the sensor has stored the sensor data, processor 400 may cause status indicator 204 to provide an indication to the user that the sensor has been successfully programmed with the sensor data.

At block 914, after the sensor has been programmed with the sensor data, processor 400 may place the sensor back into the normal mode of operation. This may occur within a predetermined time from when the sensor was successfully programmed, or it may occur after processor 400 receives a command from either stand-alone programming device 300 or transducer module 310, to place the sensor back into the normal mode of operation. As before, detector 404 detects changes in a magnetic or RF field, or detects changes in infra-red light and produces a signal that causes processor 400 to place the sensor back into the normal mode of operation.

At block 916, if the sensor was not successfully programmed, for example there was an error in receiving or storing the sensor data, processor 400 may cause status indicator 204 to provide an alert to the user that the sensor was not successfully programmed with the sensor data.

Figure 10:
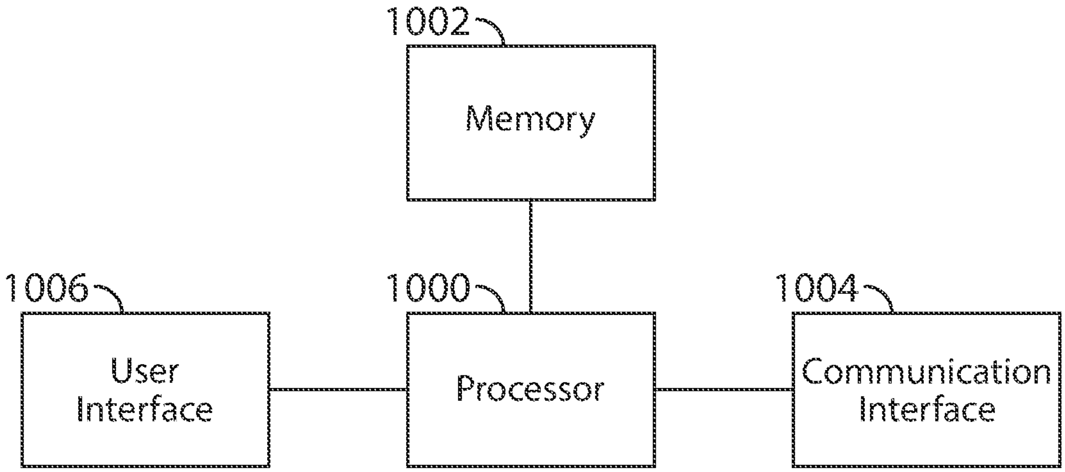
FIG. 10 is a functional block diagram of one embodiment of the computing device as shown in FIG. 3*b*.

FIG. 10 is a functional block diagram of one embodiment of computing device 308 as shown in FIG. 3*b*. Computing device could comprise a smart phone, tablet computer, portable computer, or some other portable computing device.

FIG. 10 shows processor 1000, memory 1002, communication interface 1004, and user interface 1006. It should be understood the functional blocks may be connected to one another in a variety of ways, and that some functionality is not shown (such as a power supply), for purposes of brevity and clarity.

Processor 1000 is configured to provide general operation of computing device 308 by executing processor-executable instructions stored in memory 502, for example, executable code. Processor 1000 typically comprises a general purpose processor, such an Intel i5 microprocessor manufactured by Intel of Santa Clara, California, or a SnapDragon® processor manufactured by Qualcomm Incorporated of San Diego, California, although any one of a variety of microprocessors, microcomputers, and/or microcontrollers may be used alternatively.

Memory 1002 comprises one or more information storage devices, such as RAM, ROM, EEPROM, UVPROM, flash memory, SD memory, XD memory, or other type of electronic, optical, or mechanical memory device. Memory 1002 is used to store processor-executable instructions for operation of computing device 308 as well as any information used by processor 1000 during a sensor programming process, such as sensor data received via communication interface 1004 and/or sensor data via user interface 1006.

Communication interface 1004 allows sensor data and updated firmware to be received from an external source, such as another computing device, for providing sensor data from a source other than user interface 1006. It may also be used to send sensor data to transducer module 310. Communication interface 1004 may be used in situations where sensor firmware is updated or any time a large amount of sensor data is being sent to a sensor to be programmed. Sensor data received over communication interface 1004 is typically stored in memory 1002 until it is used by processor 1000 to program a sensor, where it may be sent to transducer module 310 over the same or different communication interface as the sensor data was received. For example, communication interface 1004 may comprise Wi-Fi circuitry for receiving sensor data and USB circuitry for sending the sensor data to transducer module 310. Communication interface 1004 comprises well known circuitry, such as Wi-Fi, Ethernet, USB, or some other type of well-known communication circuitry.

User interface 1006 allows a user of computing device 308 to interact with the software program in order to program a sensor. User interface 1006 comprises any combination of well-known data interface hardware, such as a keyboard, mouse, track ball, display, touch screen display, etc. In one embodiment, a user of computing device 308 enters sensor data into computing device 308 via user interface 1006 when prompted by the software program, as well as entering a command to place a sensor to be programmed into a programming mode of operation. User interface 1006 may also be used to place the sensor back into a normal mode of operation after it has been programmed.

Figure 11:
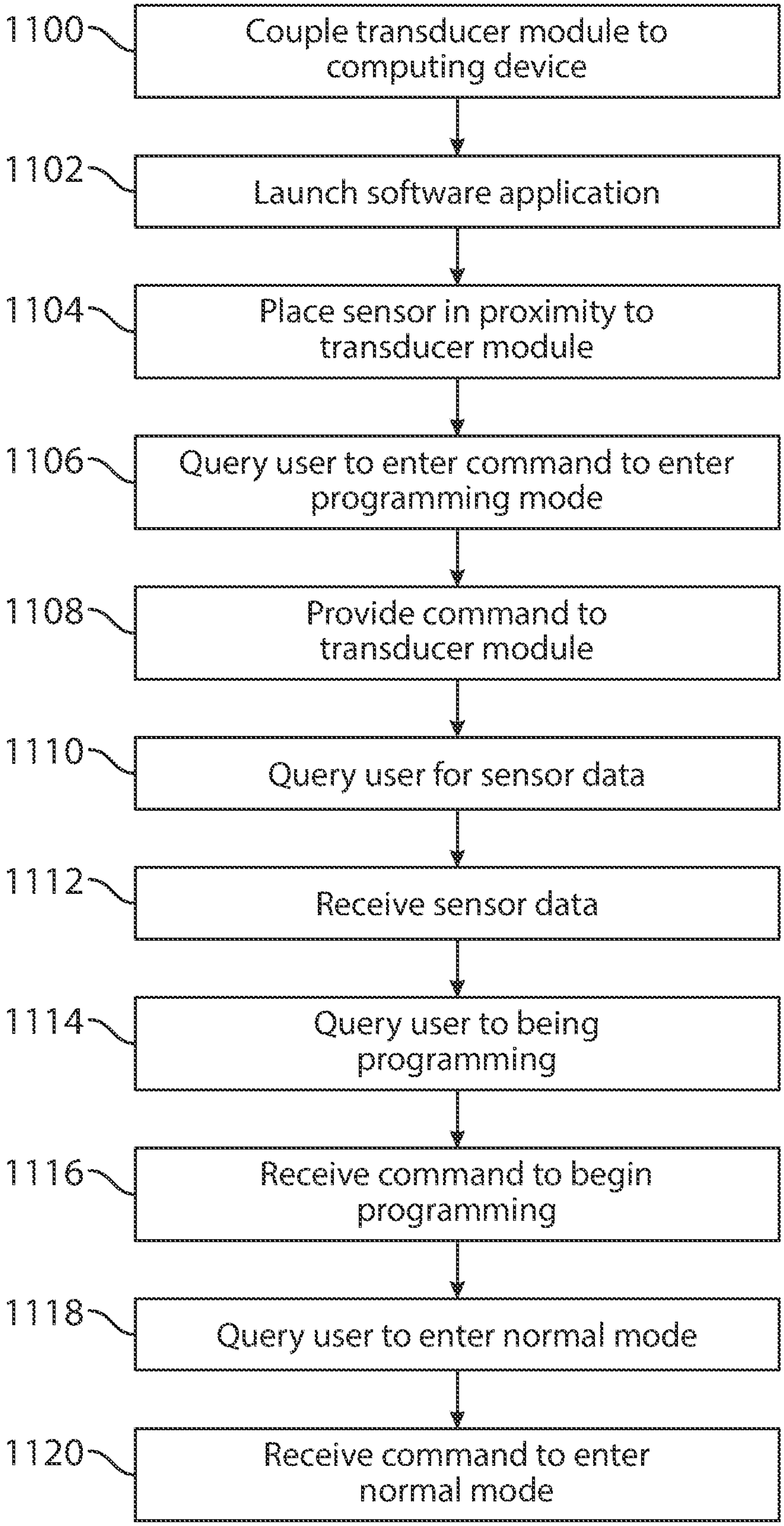
FIG. 11 is a flow diagram illustrating one embodiment of a method of how the computing device shown in FIG. 3*b* operates during a programming operation.

FIG. 11 is a flow diagram illustrating a method of how computing device 308 operates during a programming operation. Reference is made to the embodiment shown and described by FIG. 6, using computing device 308 coupled to transducer module 310. It should be understood that in some embodiments, not all of the steps shown in FIG. 11 are performed. It should also be understood that the order in which the steps are carried out may be different in other embodiments.

At block 1100, transducer module 310 is coupled to computing device 308 via well-known wired or wireless means.

At block 1102, a user of computing device 308 launches a software application resident on computing device 308 for programming a sensor via user interface 1006. The software program may query the user to place a sensor to be programmed in proximity to transducer module 310.

At block 1104, the sensor to be programmed is placed in proximity to transducer module 310.

At block 1106, after the sensor has been placed in proximity to transducer module 310, the processor 1000 may query the user, via user interface 1006, to enter a command into computing device 308 to place the sensor into a programming mode of operation.

At block 1108, the user enters the command into computing device 308 via user interface 1006 for the sensor to enter a programming mode of operation. The command is received by processor 1000, where it is then provide to transducer module 310 via communication interface 1004. The command comprises a digital signal that is recognized by the sensor to enter the programming mode of operation.

At block 1110, after the sensor has entered the programming mode of operation, processor 1000 may query the user to provide sensor data via communication interface 1004, user interface 1006, or both.

At block 1112, the user may provide sensor data to computing device 308 via user interface 1006 or communication interface 1004, or both. Such sensor data may comprise a serial number matching a defective sensor in need of replacement in the field, a firmware update for the sensor, or some other information pertinent to the sensor. The sensor data is typically stored in memory 1002 by processor 1000.

At block 1114, after the user has provided the sensor data, processor 1000 may query the user via user interface 1006, to enter a command to begin the programming operation.

At block 1116, the user enters the command to begin the programming operation via user interface 1006. The command is received by processor 1000, which provides the sensor data to transducer module 310 via communication interface 1004.

At block 1118, after the sensor has been programmed with the sensor data, processor 1000 may query the user, via user interface 1006, to enter a command to place the sensor back into a normal mode of operation.

At block 1120, the user may enter the command to place the sensor back into the normal mode of operation via user interface 1006. The command is received by processor 1000, which sends the command to communication interface 1004, where it is then provided to transducer module 310. Transducer module then modulates an emission or property produced by transducer 604 in accordance with the command. Detector 404 detects the modulated emission or property and re-produces the command for use by processor 400. Processor 400 then causes the sensor to enter the normal mode of operation.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A portable programming device for programming a replacement sensor at a customer location, comprising:

a user interface;

a data interface;

a memory for storing processor-executable instructions;

a transducer for modulating a magnetic field, an RF signal or infra-red light; and a processor, coupled to the user interface, data interface, the memory and the transducer driver, for executing the processor-executable instructions that causes the portable programming device to:

receive, by the processor, a signal that indicates that a predetermined user input has been received via the user interface;

respond, by the processor, to the predetermined user input being received via the user interface by modulating, by the transducer, the magnetic field, the RF signal or the infra-red light in accordance with a command for causing the replacement sensor to enter into a programming mode;

receive, by the processor, sensor data from the data interface, the sensor data comprising sensor identification information from a defective sensor; and modulate, by the transducer, the magnetic field, the RF signal or the infra-red light in accordance with the sensor identification information received by the processor from the data interface.

2. The portable programming device of claim 1, further comprising:

a transducer driver;

wherein the processor-executable instructions that cause the magnetic field, the RF signal or the infra-red light to be modulated comprises instructions that causes the portable programming device to:

provide, by the processor, the sensor data to the transducer driver; and generate, by the transducer driver, an electronic driver signal corresponding to the sensor data capable of electronically driving the transducer.

3. The portable programming device of claim 1, wherein the processor-executable instructions further comprise instructions that further cause the apparatus to:

receive, by the processor, a second signal that indicates that a second predetermined user input has been received via the user interface; and respond, by the processor, to the second predetermined user input being received via the user interface by modulating, by the transducer, the magnetic field, the RF signal or the infra-red light in accordance with a second command for causing a sensor of a type corresponding to the replacement sensor to enter into normal mode of operation.

4. The portable programming device of claim 1, wherein the sensor data comprises a serial number of the defective sensor at the customer location.

5. The portable programming device of claim 1, wherein the replacement sensor comprises a reed switch module for demodulating the modulated magnetic field to reproduce the sensor data.

6. A method performed by a portable programming device for programming a replacement sensor in the field, comprising:

receiving a signal that indicates that a predetermined user input has been received via a user interface;

responding to the predetermined user input being received via the user interface by modulating via a transducer of the portable programming device a magnetic field, an RF signal or an infra-red light in accordance with a command for causing the replacement sensor to enter into a programming mode;

receiving a sensor data via a data interface of the portable programming device, the sensor data comprising sensor identification information of a defective sensor in a field;

modulating via the transducer of the portable programming device the magnetic field, Drill the RF signal or the infra-red light in accordance with the sensor identification information received via the data interface; and programming the replacement sensor with the sensor data of the defective sensor as a result of the replacement sensor detecting the modulated magnetic field, the modulated RF signal, or the modulated infra-red light.

7. The method of claim 6, wherein modulating the magnetic field, the RF signal or the infra-red light comprises:

providing the sensor data to a transducer driver;

generating an electronic driver signal corresponding to the sensor data, the electronic driver signal for driving the transducer that modulates the magnetic field, the RF signal or the infra-red light.

8. The method of claim 6, further comprising:

receiving a second signal that indicates that a second predetermined user input has been received via the user interface;

responding to the second predetermined user input being received via the user interface by modulating via a transducer of the portable programming device the magnetic field, the RF signal or the infra-red light in accordance with a second command for causing the replacement sensor to enter into a normal mode of operation.

9. The method of claim 6, wherein the sensor data comprises a serial number of the defective sensor at a customer location.

10. The method of claim 6, wherein the replacement sensor comprises a reed switch module for demodulating the modulated magnetic field to reproduce the sensor data.

* * * * *